US011232303B2

(12) United States Patent
Muehlfeld et al.

(10) Patent No.: US 11,232,303 B2
(45) Date of Patent: *Jan. 25, 2022

(54) GROUND CONTROL POINT EXTRACTION FROM PLANTING DATA

(71) Applicant: Sentera, Inc., Minneapolis, MN (US)

(72) Inventors: Andrew Muehlfeld, Minneapolis, MN (US); Eric Taipale, Minneapolis, MN (US)

(73) Assignee: Sentera, Inc., St. Paul, MN (US)

( * ) Notice: Subject to any disclaimer, the term of this patent is extended or adjusted under 35 U.S.C. 154(b) by 118 days.

This patent is subject to a terminal disclaimer.

(21) Appl. No.: 16/790,119

(22) Filed: Feb. 13, 2020

(65) Prior Publication Data

US 2020/0184188 A1 Jun. 11, 2020

Related U.S. Application Data

(63) Continuation of application No. 15/862,414, filed on Jan. 4, 2018, now Pat. No. 10,614,305.

(51) Int. Cl.
  *G06K 9/00* (2006.01)
  *G06T 5/50* (2006.01)
  (Continued)

(52) U.S. Cl.
  CPC ............. *G06K 9/0063* (2013.01); *G06T 5/50* (2013.01); *G06T 7/73* (2017.01); *G06T 17/05* (2013.01);
  (Continued)

(58) Field of Classification Search
  CPC ............. G06K 9/0063; G06K 9/6276; G06K 9/00657; G06K 2009/2045; G06K 9/32; G06K 9/00577; G06K 9/46; G06T 7/73; G06T 5/50; G06T 17/05; G06T 3/4038; G06T 2207/10032; G06T 2207/30181;
  (Continued)

(56) References Cited

U.S. PATENT DOCUMENTS 6,178,253 B1 * 1/2001 Hendrickson ......... G01J 3/2803
                                                        348/144
9,875,430 B1   1/2018 Keisler et al.
(Continued)

*Primary Examiner* — Duy M Dang
(74) *Attorney, Agent, or Firm* — Hamre, Schumann, Mueller & Larson, P.C.

(57) ABSTRACT

The present subject matter provides a technical solution for various technical problems associated with precision agriculture imagery. One solution to improving precision agriculture imagery includes identification and use of ground control points. A ground control point may include the association of a visible feature in an image of an agricultural field with a geospatial coordinate. A ground control point may be used as a common reference point between two aerial images, thereby improving alignment between the two images during stitching. The ground control points may be generated using planting prescription data or as-planted data, which may include one or more intentionally unplanted regions within an agricultural filed. Multiple aerial images may be stitched together using these ground control points to generate a precisely georeferenced output image, thereby improving the accuracy of the precision agriculture output image.

12 Claims, 10 Drawing Sheets

(51) Int. Cl.
*G06T 17/05* (2011.01)
*G06T 7/73* (2017.01)
(52) U.S. Cl.
CPC .............. *G06T 2207/10032* (2013.01); *G06T 2207/10036* (2013.01); *G06T 2207/30188* (2013.01)
(58) Field of Classification Search
CPC . G06T 2207/10024; G06T 2207/10028; G06T 2207/20221; G06T 2207/30244; G06T 2207/30252; G06T 7/33; G06T 11/60; G06T 11/00; G06T 15/20
See application file for complete search history.

(56) References Cited

U.S. PATENT DOCUMENTS

| | | | |
|---|---|---|---|
| 10,402,942 B2 | 9/2019 | Taipale et al. | |
| 2011/0295575 A1* | 12/2011 | Levine | G06Q 30/02 703/2 |
| 2014/0285673 A1 | 9/2014 | Hundley | |
| 2015/0371431 A1* | 12/2015 | Korb | G06K 9/00208 382/113 |

* cited by examiner

GROUND CONTROL POINT EXTRACTION FROM PLANTING DATA

TECHNICAL FIELD

Embodiments described herein generally relate to precision agriculture.

BACKGROUND

In precision agriculture, aerial or satellite imagery may be used to capture an image of an agricultural field. More than one images are often used to capture an agricultural field, especially when using higher resolution imagery provided by aerial vehicles (e.g., drones) such as unmanned aerial vehicles (UAVs). These multiple images may be combined using image stitching software, which may use complex image analysis and comparison algorithms to align the multiple images and generate a high-resolution, stitched output image (e.g., mosaic image) of the agricultural field. However, the algorithm for stitching is complex and time-consuming, and may require several hours of post-processing previously captured images. Additionally, errors between the output mosaic image and the field location may result in incorrect application of herbicides or pesticides. What is needed is an improved aerial imagery stitching solution.

DESCRIPTION OF EMBODIMENTS

Figure 1:
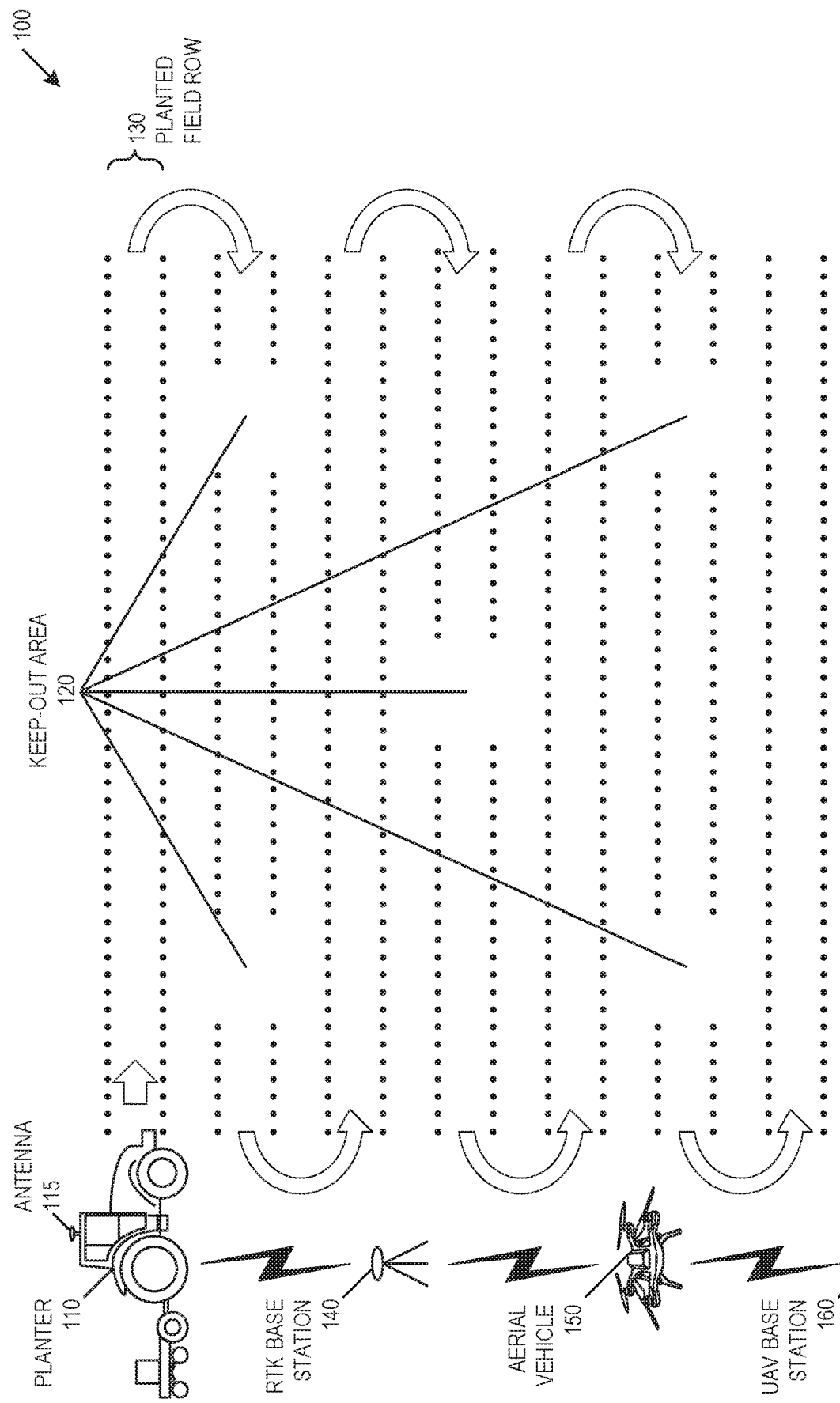
FIG. 1 is a diagram of a ground control point system, in accordance with at least one embodiment.

The present subject matter provides a technical solution for various technical problems associated with precision agriculture imagery. One solution to improving precision agriculture imagery includes identification and use of ground control points (GCPs). A ground control point may be implemented as installation of a physical object within an agricultural field, or may include the intentional avoidance of planting in a predefined area within an agricultural field. A ground control point may provide a visible feature within an image of an agricultural field, and the visible feature may be identified and associated with a geospatial coordinate. A ground control point may be used as a common reference point between two aerial images, thereby improving alignment between the two images during stitching. The ground control points may be generated using planting prescription data or as-planted data, which may include one or more intentionally unplanted regions within an agricultural filed. The ground control points may include intentional deviations from conventional parallel row planting, such as perpendicular or other non-parallel planting patterns. Multiple aerial images may be stitched together using these ground control points to generate a precisely georeferenced output image, thereby improving the accuracy of the precision agriculture output image. These ground control points may be used to provide georeferencing, such as by identifying a location corresponding to each portion of an image. For example, an image may include a ground control point with a known location (e.g., latitude, longitude, altitude), and the coordinates of the known location may be used to georeference each pixel within the image, thereby providing an orthorectified mosaic (e.g., orthomosaic). Ground control points may be used to georeference one or more pixels within a single source image (e.g., image captured by a UAV), within multiple source images, within a stitched output mosaic image, or within one or more other image types.

A georeferenced output image generated using ground control points may be based on a single input image or based on multiple input images stitched together. The stitching of multiple input images may be used to reduce or eliminate one or more error sources, such as an error in the pointing angle of the camera as provided by an inertial measurement unit (IMU). For example, IMU pointing angle errors may be averaged and reduced or removed from multiple captured images. An IMU with increased precision (e.g., tactical grade IMU) may also be used to reduce or eliminate IMU pointing angle errors, and improve the accuracy of the georeferenced output image generated using ground control points. Multiple ground control points may be used to reduce or eliminate various error sources within the input or output images. For example, a stitched output mosaic image of a rectangular field may be distorted into a trapezoidal shape, and four ground control points may be used to correct the shape of the output image and georeference the pixels within the output image. In another example, a ground control point may be associated with a geospatial coordinate and a pixel location in one or more aerial images, and the association provided as input to a stitching process. The association of a ground control point with a geospatial coordinate and pixel location may be performed automatically or may include receiving a user input. For example, each ground control point may have an associated geospatial coordinate, a user may be presented with an image and a list of ground control points, and the user may provide an input that indicates the location of each ground control point within the image. The use of ground control points in a stitching process increases the precision of the stitching process, and increases the precision of the georeferenced output image. Ground control points may be applied after stitching to provide various post-processing corrections, such as to shift or warp the mosaic produced by the stitching process.

The following description and the drawings sufficiently illustrate specific embodiments to enable those skilled in the art to understand the specific embodiment. Other embodiments may incorporate structural, logical, electrical, process, and other changes. Portions and features of various embodiments may be included in, or substituted for, those of other embodiments. Embodiments set forth in the claims encompass all available equivalents of those claims.

FIG. 1 is a diagram of a ground control point system 100, in accordance with at least one embodiment. In an example, the ground control point system 100 uses planting patterns to generate ground control points for use in image stitching mosaic generation. The planting patterns may be implemented using planting prescription data, where a planter vehicle 110 uses the planting prescription data to plant seeds and to skip planting seeds in one or more keep-out areas 120 within a planted row 130. As the planted seeds grow, the keep-out areas 120 would be visible as areas of bare soil surrounded by growing plants. The geospatial coordinates of these keep-out areas 120 may be extracted based on the planting prescription data used to define the keep-out areas 120. The geospatial coordinates of these keep-out areas 120 extracted based on planting prescription data may be verified or updated using as-planted data, or extracted directly from as-planted data instead of planting prescription data, where the as-planted data indicates the tracked location of planted seeds throughout a field, which may differ from the intended planting locations defined by planting prescription data. For example, the planting prescription data may instruct a seed to be planted in a location, and a camera or seed dispersal mechanism may record an actual planted location that is different from the planting prescription data location. The geospatial coordinates of these keep-out areas 120 may be determined using planting prescription data or as-planted data. A ground control point may be identified based on the planting data coordinates of each keep out area 120. A ground control point may also be identified based on image analysis, such as applying feature detection to identify a center point between two adjacent keep-out areas (e.g., FIGS. 2-3) or applying feature detection to row intersection or row corner (e.g., FIGS. 5-7). The identified ground control points may be used to georeference an output image to a coordinate reference system (CRS), such as by mapping each pixel within the output image to a CRS coordinate. These geospatial coordinates may include geographic coordinates or projected coordinates. For example, the geospatial coordinates may include geographic coordinates such as latitude, longitude, and elevation within the World Geodetic System 1984 (WGS-84) or {x,y,z} coordinates within the earth-centered earth fixed (ECEF) CRS. In another example, the geospatial coordinates may include projected coordinates, such as meters easting, meters northing, and meters elevation (e.g., meters in an {x,y,z} Cartesian plane) within the Universal Transverse Mercator (UTM) CRS. In various examples, the geographic coordinates or projected coordinates may include or exclude elevation. Stitching multiple input images may be based on image feature extraction, such as identification of groups of pixels that are in common between two input images. Stitching multiple input images may be improved by using identified ground control points, such as by identifying one or more ground control points or by using the georeferencing provided by previously determined ground control points to ensure the output image is accurately georeferenced.

The geospatial coordinates of the keep out areas 120 may be determined using various location-based radio systems. For example, planter vehicle 110 may include an antenna 115 for receiving signals from a global navigation satellite system (GNSS) such as Global Positioning System (GPS). The planter vehicle 110 may also receive location augmentation signals from a GNSS or from a local base station, such as a real-time kinematic (RTK) base station 140. The base station 140 may provide a precise location based on a combination of GNSS information and local geographic surveys, such as a location with centimeter-level precision.

The planter vehicle 110 may combine received GNSS signals with a signal from the base station 140 to generate a differential location solution with improved precision (e.g., differential GPS), such as by reducing or eliminating atmospheric or other error sources. The planter vehicle 110 may use location information in conjunction with prescription data or as-planted data. For example, the planter vehicle 110 may use location information along with prescription data to determine where to plant seeds, or may record location information whenever a seed is planted to generate as-planted location data. By improving the accuracy of the location of the planter vehicle 110, the accuracy of the as-planted data files is improved. The accuracy of the as-planted data files may be affected by a planting mechanism offset error, such as described below with respect to FIG. 3.

An aerial vehicle 150 may be used to capture aerial imagery of the field, and the aerial vehicle 150 may also receive location information from GPS or from the RTK base station 140. It may be impractical or impossible for the aerial vehicle 150 to use information provided by the RTK base station, and the aerial vehicle 150 may instead receive location augmentation signals from a UAV base station 160. In some examples, one or both of the RTK base station 140 or UAV base station 160 may have an incorrect survey location, which may lead to errors in the planting prescription data, the as-planted data, or the captured aerial image location information. For example, an incorrect survey location may result in an error offset between an achieved planting location and the prescription data, and may result in an error offset between the achieved planting location and the recorded as-planted data. The generation and use of keep-out areas 120 provides for synchronization among locations within the planting prescription data, the as-planted data, and the captured aerial image location information. This synchronization provides the ability to align the output image precisely with the geospatial coordinates. In an example, a precisely georeferenced output image allows correlating any pixel within the image with a geospatial coordinate. These precisely georeferenced output image may be processed to determine agricultural characteristics of a field, which may be used for generation or analysis of agricultural plans. For example, a precisely georeferenced image may be used to generate or analyze an experiment that uses a location-based or variable rate application of seeds, treatments (herbicide, pesticide, fertilizer, fungicide,) or irrigation water. The synchronization provides improved reliability in the generation or analysis of agricultural plans, such as by reducing or eliminating discrepancies between the planting data, the as-planted data, and the captured aerial image location information. For example, a difference between the planting data and captured aerial image location may result in a subsequent application of herbicide or pesticide being applied in an incorrect location, which may result in undesired treatment of healthy crop and failure to treat the intended weeds or pest-infested crop. The precisely georeferenced output image provided by the generation and use of keep-out areas 120 reduces or eliminates the errors that may be caused by an incorrectly surveyed RTK base station 140 or incorrectly surveyed UAV base station 160. This generation and use of keep-out areas 120 may also reduce or eliminate the need for surveying a base station or for surveying and installing a permanent ground control point, such as a permanent field marker.

Figure 2:
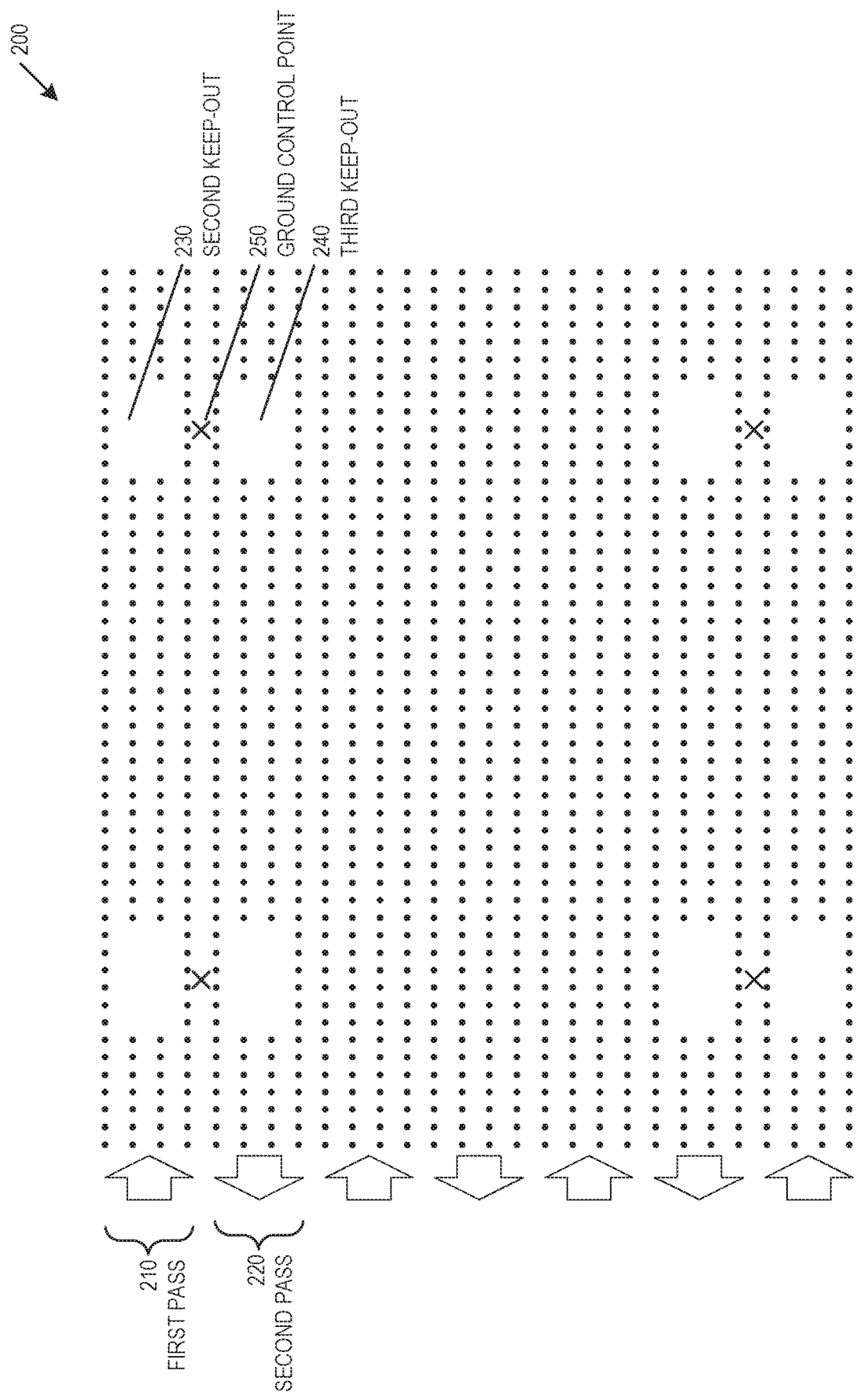
FIG. 2 is a diagram of keep-out planting data, in accordance with at least one embodiment.
Figure 3:
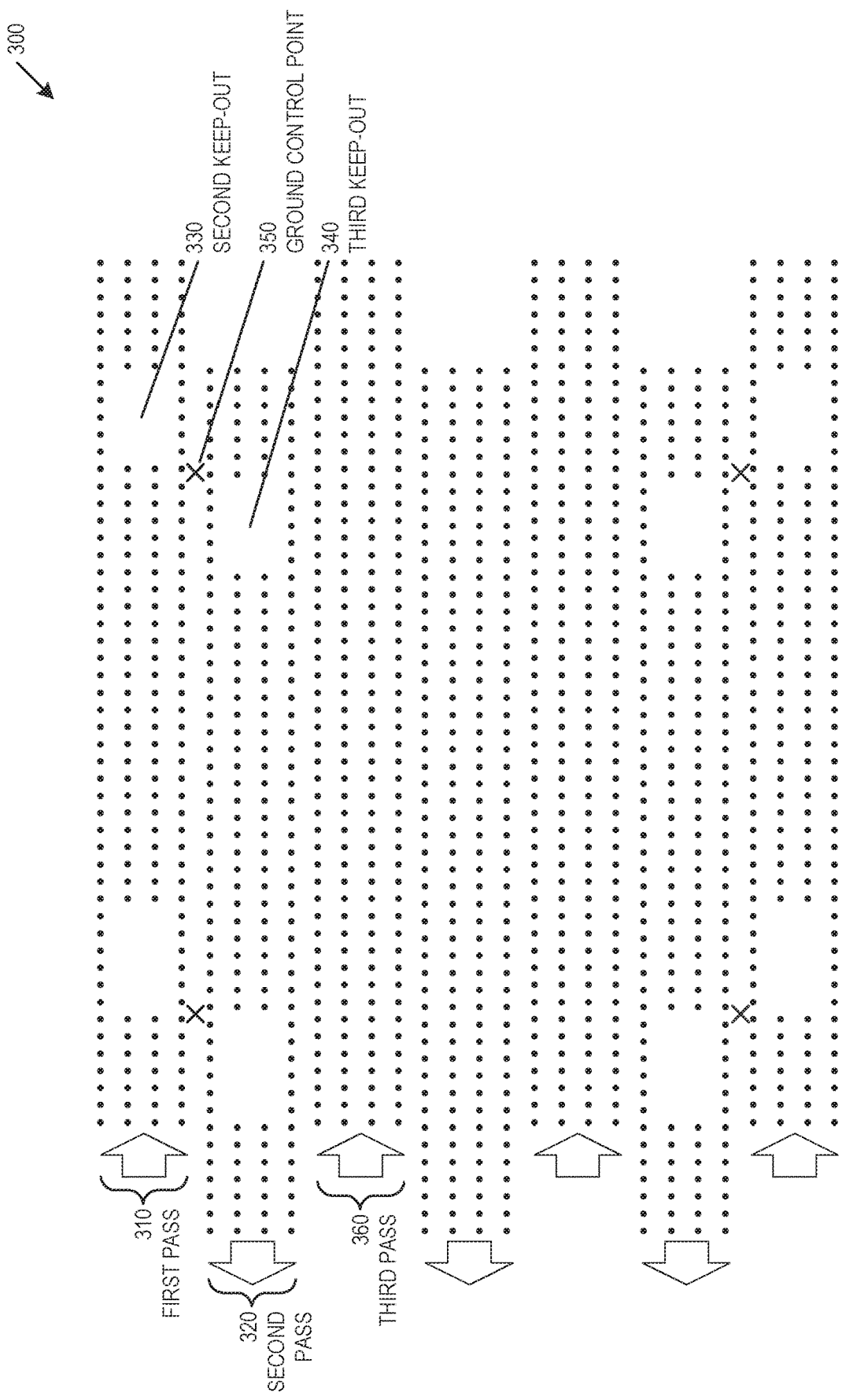
FIG. 3 is a diagram of an offset error image, in accordance with at least one embodiment.

The planter vehicle 110 may accept variable rate planting prescriptions, which may be used to reduce the frequency of seeds planted in the keep-out area 120. The planter vehicle 110 may accept a planting prescription data file that indicates the locations to plant seeds. The seed planting locations may be individual seed locations, seed row locations, seed planting rates along rows, seed spacings along rows, seed row vectors, or other types of seed planting locations. A planter data file configured to plant full rows may be modified to omit seeds in a keep-out area 120, where the keep-out area 120 may be defined as a seed row portion, a keep-out vector, a two-dimensional keep-out polygon, or other area. The keep-out areas 120 may include one or more corners or a center of a field. The keep-out area 120 locations may be selected to provide information about the geometry or geography of a field, such as the geographic center of a field, the four corners of a rectangular field, the northernmost point of a circular field, high and low elevation extremes of a hilly field, or other geometric or geographic information about the field. The ground control points provided by multiple keep-out areas 120 may be used to generate a 3-D point cloud of the field, and the 3-D point cloud may be used to improve image stitching or generate a digital surface model (DSM). For example, the ground control points may include a local minimum and local maximum elevation value, and these local minimum and local maximum values may be used to improve the accuracy of the magnitude of the contours within the 3-D DSM. The number of ground control points may contribute to various accuracy improvements to a 3-D point cloud, a 3-D DSM, and the georeferenced output image (i.e., the orthomosaic). For example, three corner ground control points may constrain the 2-D length and width of a field, a fourth corner ground control point may reduce warping of the length and width of a field, and a fifth ground control point in the center of the field may reduce 3-D warping of the 3-D model of the field. More than one keep-out area 120 may also be used to identify or compensate for possible errors in the locations stored in the planting data or as-planted data, such as shown in FIGS. 2-3. FIG. 2 is a diagram of keep-out planting data 200, in accordance with at least one embodiment. The keep-out planting data 200 includes at least a first pass 210 and a second pass 220, such as by a four-row planter. When location information is correctly applied to the seed planting, the beginning and ending points of the first pass 210 and second pass 220 may be aligned to form a substantially symmetric grid. The first pass 210 may include a second keep-out area 230 and the second pass 220 may include a third keep-out area 240. The second keep-out area 230 and the third keep-out area 240 may be used to identify a ground control point 250, such as a center point between the two keep-out areas. When location information about the relative offset of the planter's GPS from the seed delivery point is not correctly applied to the seed planting, the beginning and ending points of the first pass 210 and second pass 220 may be misaligned, such as shown in FIG. 3.

FIG. 3 is a diagram of an offset error image 300, in accordance with at least one embodiment. The offset error image 300 includes at least a first pass 310 and a second pass 320, such as by a four-row planter. When location information is incorrectly applied to the seed planting, the beginning and ending points of the first pass 310 and second pass 320 may be misaligned to form groups of offset rows. In an example, the offset rows may be caused by an inaccurate measurement between the seed delivery mechanism location and the effective center of the navigation system (e.g., the phase center of the GPS antenna). Because the planting uses location information, successive passes in opposite directions may be consistently offset relative to each other in the direction of planter travel, and alternating passes in the same direction may be aligned. For example, as shown in offset error image 300, the beginning and ending points of the first pass 310 and third pass 360 may be aligned.

The consistency in this planter offset may be used to correct for the planter offset by calculating a ground control point between adjacent keep-out areas. For example, the first pass 310 may include a second keep-out area 330 and the second pass 320 may include a third keep-out area 340, and the second keep-out area 330 and the third keep-out area 340 may be used to identify a ground control point 350. Because the planter offset during the first pass 310 is in a direction opposite from the misalignment during the second pass 320, the planter offsets in opposite directions cancel each other out at the ground control point 350 between adjacent second keep-out area 330 and third keep-out area 340. The aerial imagery may use the second keep-out area 330 and third keep-out area 340 to determine the ground control point 350, and the planter offset correction may be used to apply subsequent treatments in correct locations, such as herbicide application, pesticide application, fungicide application, irrigation, planting, or other treatments.

Figure 4:
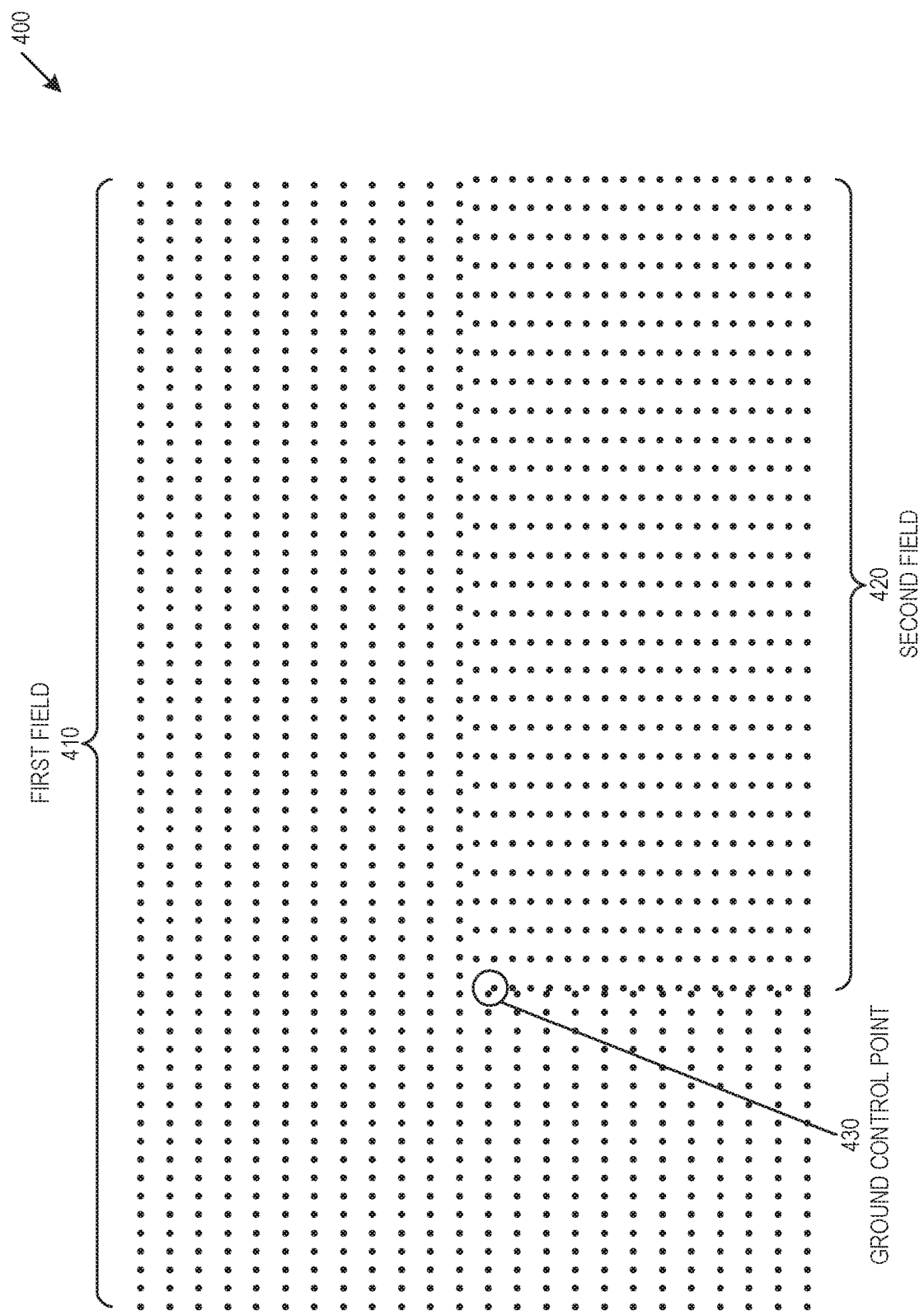
FIG. 4 is a diagram of a first alignment planting configuration, in accordance with at least one embodiment.

FIG. 4 is a diagram of a first alignment planting configuration 400, in accordance with at least one embodiment. The first field alignment 400 includes a first field 410 planted perpendicular to a second field 420. A ground control point 430 may be extracted based on the geometric intersection of two non-parallel passes. The ground control point 430 may be on the interior of the combined first field 410 and second field 420, or may be at an outer edge of the intersection of the first field 410 and second field 420. In particular, the ground control point 430 may be determined based on the position of the planter in the dimension perpendicular to travel. By selecting a ground control point based on the intersection between non-parallel passes, the user-introduced error in offset between planter and GPS receiver is reduced or eliminated. Additional ground control points may be selected based on a geographically defined unplanted region (not shown).

Figure 5:
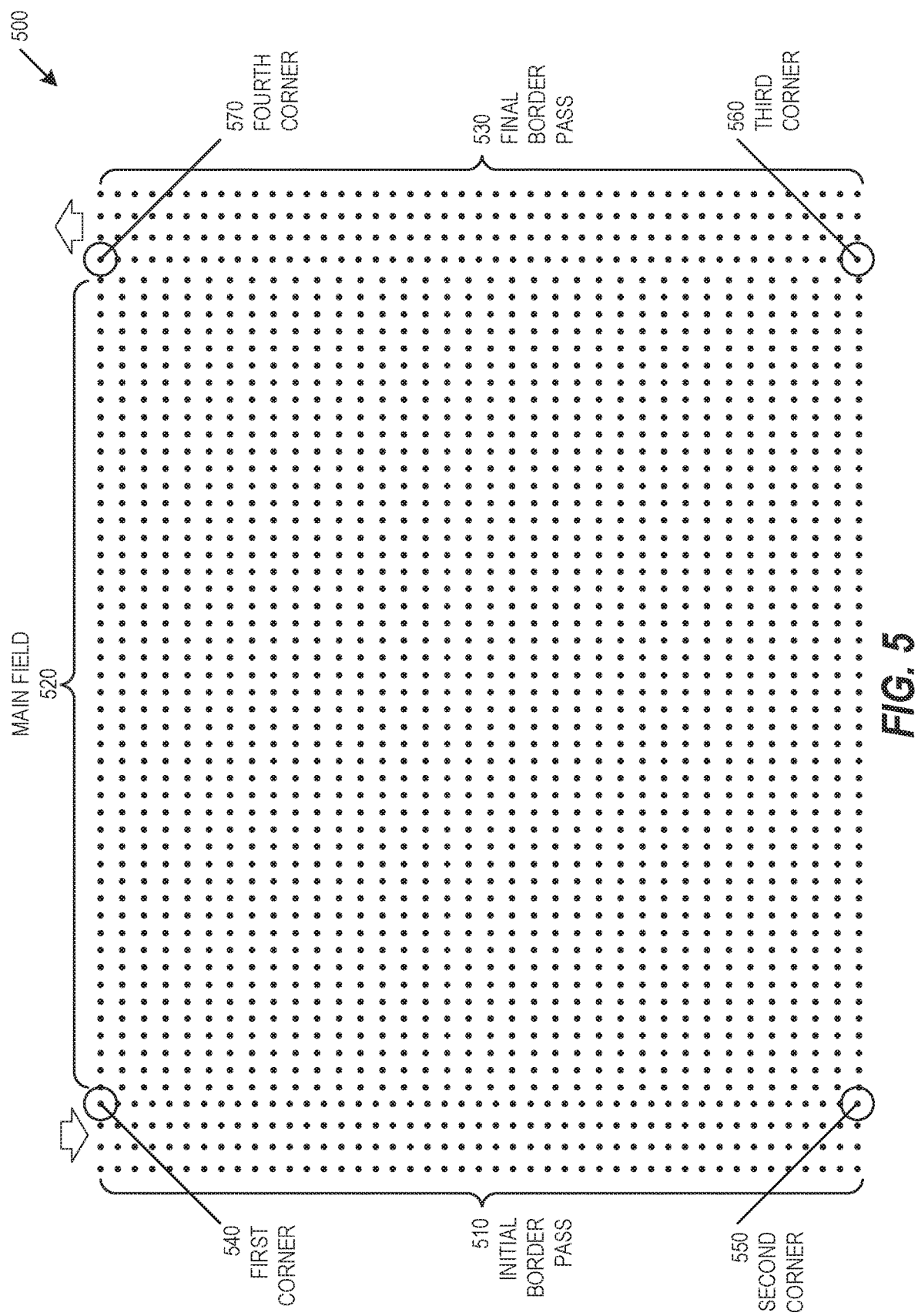
FIG. 5 is a diagram of a second alignment planting configuration, in accordance with at least one embodiment.

FIG. 5 is a diagram of a third alignment planting configuration 500, in accordance with at least one embodiment. Planting configuration 500 may be planted using multiple perpendicular passes. In an example, planting configuration 500 is planted using an initial border pass 510, a main field 520 including multiple passes perpendicular to the initial border pass 510, and a final border pass 530 perpendicular to the direction of the main field 520. The direction of the initial border pass 510 and the direction of the main field 520 may be used to determine a first corner 540 and a second corner 550 based on the row of the initial border pass 510 closest to the main field 520. Similarly, the direction of the main field 520 and the direction of the final border pass 530 may be used to determine a third corner 560 and a fourth corner 570 based on the row of the final border pass 530 closest to the main field 520. Though planting configuration 600 are shown using perpendicular passes, other non-parallel passes may be used to determine one or more ground control points. In an example, non-parallel passes may be identified based on an angle of two adjacent passes exceeding a threshold angle. The intersection of the main field 520 and the initial border pass 510 or final border pass 530 may be difficult to identify mid-season, and additional planting configurations may be used to determine ground control points, such as shown in FIG. 6.

Figure 6:
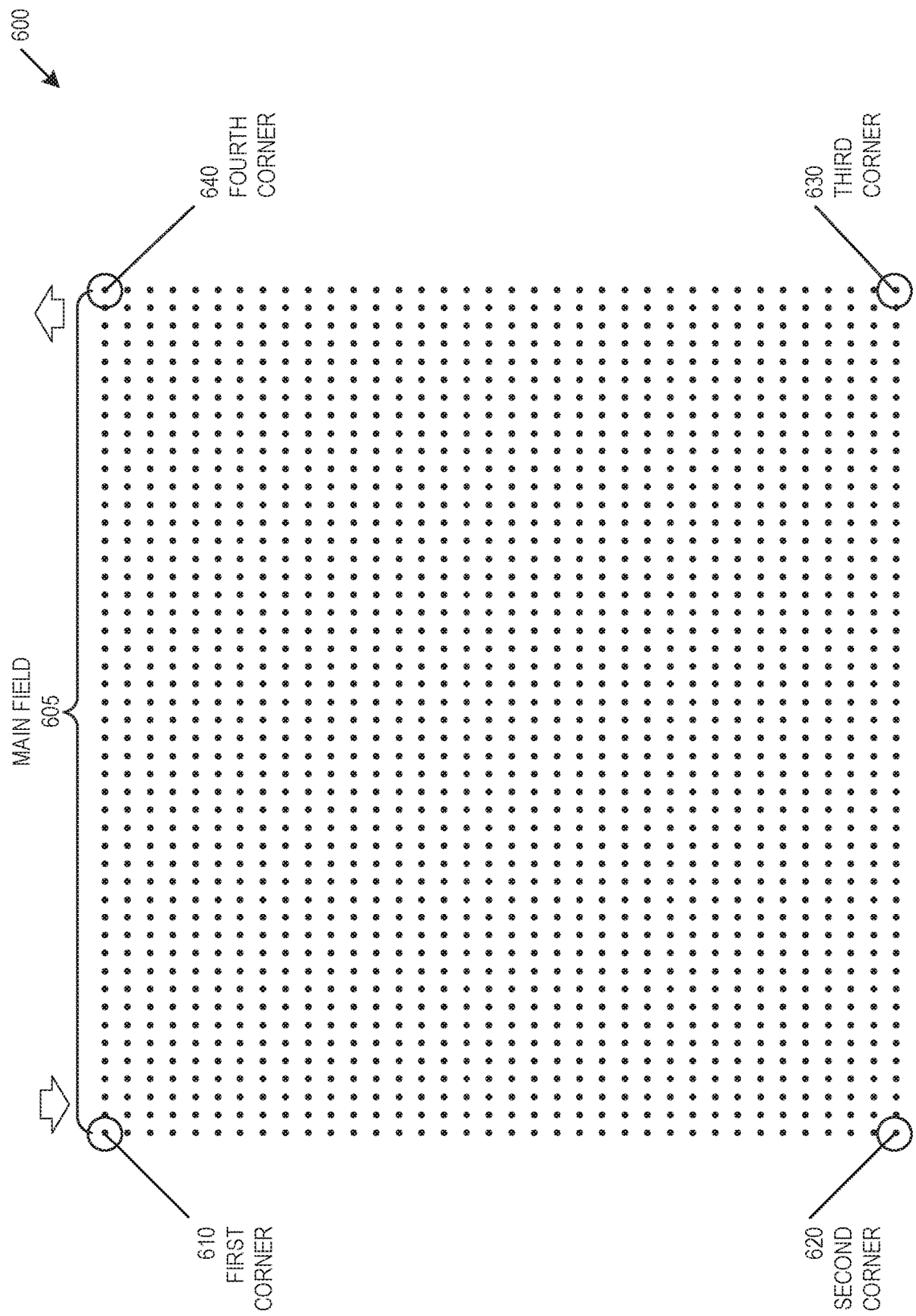
FIG. 6 is a diagram of a third alignment planting configuration, in accordance with at least one embodiment.

FIG. 6 is a diagram of a fourth alignment planting configuration 600, in accordance with at least one embodiment. Planting configuration 600 may be planted using multiple parallel passes. The resulting main field 650 may include four corners, including first corner 610, second corner 620, third corner 630, and fourth corner 640. These corners may be identifiable without requiring additional perpendicular border passes.

Figure 7:
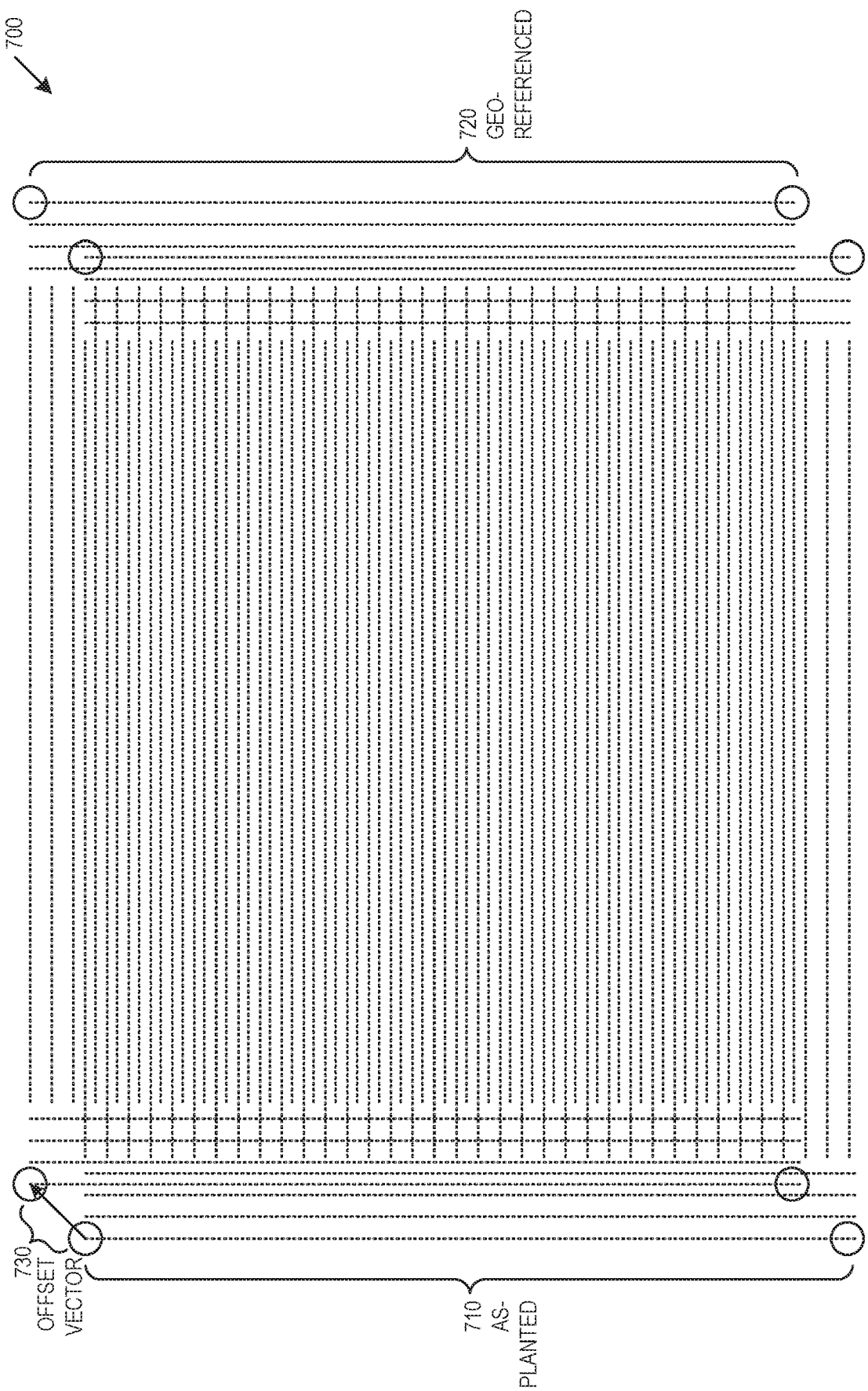
FIG. 7 is a diagram of an offset vector determination, in accordance with at least one embodiment.

FIG. 7 is a diagram of an offset vector determination 700, in accordance with at least one embodiment. Ground control points may be used to transform coordinates between two or more coordinate reference systems (CRSs). For example, a UAV may collect location information based on a standard CRS from a GPS receiver on the UAV, and may use that location information to generate a georeferenced data 720 showing locations of as-planted rows. Although farm machinery is typically configured to use a standard CRS, the farm machinery CRS is often affected by an inaccurate base station survey or other error source. The resulting coordinates reported by the farm machinery navigation system may include an offset relative to the standard CRS, and can be thought of as offset coordinates in the farm machinery CRS. The farm machinery may not be aware of the presence or magnitude of the offset, and may report the farm machinery's geospatial coordinates as if they were in a standard CRS. The farm machinery may generate as-planted data 710 in the farm machinery CRS, which may be offset from the georeferenced data 720 in the standard CRS. A survey location of an RTK base station may be inaccurate by a few meters, which may result in an RTK farm machinery navigation system detected location in the farm machinery CRS that is offset from the correct location of the RTK base station in the standard CRS. For example, a planter may report as-planted data 710 in the farm machinery CRS as 1.7 meters southwest of the georeferenced location 720 in the standard CRS. Unlike a planter offset introduced by inaccurate measurement of a distance between the seed delivery mechanism and the planter's GPS antenna shown in FIG. 3, the CRS offset does not depend on the direction of the planter. In an example, farm machinery operating with the same base station may traverse the same field to apply variable-rate treatments to the field, where the field traversal path is based on an agricultural plan developed using the georeferenced output image. The farm machinery identifies its location information in the farm machinery CRS. To apply the treatments to the field correctly, the treatment prescription must also be provided in the farm machinery CRS. In an example, the georeferenced output image used to develop the agricultural plan is georeferenced in the farm machinery CRS.

In one example, ground control points are extracted from planting data and combined with aerial images from an RTK UAV or a non-RTK UAV to identify ground control points and produce a georeferenced output image, as described in FIGS. 1-3. Because these ground control points are provided by data collected in the farm machinery CRS, the georeferenced output image is also in the farm machinery CRS. Ground control point coordinates may be extracted from planting data once, and may be assumed to be valid for subsequent flights. For each subsequent flight, the pixels of the captured images may be associated with ground control point coordinates to generate the output georeferenced stitched mosaic. In another example, aerial images from an RTK UAV using the same base station as the farm machinery are used to generate a georeferenced output image without ground control points. Because this RTK UAV location information is in the farm machinery CRS, the georeferenced output image is also in the farm machinery CRS. In either the RTK UAV example or non-RTK UAV example, the georeferenced output image is generated without requiring calculation of an offset vector.

In another example, ground control points are combined with aerial images from either an RTK UAV or a non-RTK UAV to produce a georeferenced output image, even when the ground control points are installed with ground-based survey equipment using a different base station than the farm machinery. Because these ground control points are in the standard CRS, the georeferenced output image is also in the standard CRS. In another example, images from an RTK UAV using a different base station than the farm machinery are used to generate a georeferenced output image without ground control points. Because the RTK UAV location information is captured in the standard CRS, the georeferenced output image is also in the standard CRS. In both these cases, where the georeferenced output image is in the standard CRS, determination of an offset vector between the standard CRS and farm machinery CRS enables shifting the georeferenced output image from the standard CRS to the farm machinery CRS. This CRS image shift provides for accurate treatment of the field by farm machinery.

In an example, the ground control points are used to determine a CRS offset vector 730, where the CRS offset vector 730 describes a 3-D direction and distance of the offset between the standard CRS georeferenced data 720 and the farm machinery CRS as-planted data 710. The ground control points may also be used to identify other differences between the standard CRS and the farm machinery CRS, such as a rotation, a distortion, an elevation offset, or other CRS differences. The offset vector 730 between CRSs may be determined using a georeferenced output image in the standard CRS and planting data in the farm machinery CRS. The standard CRS coordinates may be determined for each of the ground control points in the georeferenced output image, the farm machinery CRS coordinates may be determined for each of the ground control points in the planting data, and the offset vector 730 may be determined based on the differences between the standard CRS coordinates and the farm machinery CRS coordinates. Because the offset vector 730 may be used for subsequent flights, planting data ground control points are no longer required for generating georeferenced output images after the offset vector 730 is determined. In an example, a previously computed offset vector 730 may be used to shift a georeferenced output image in the standard CRS to the farm machinery CRS without using planting data.

As described above, the CRS offset vector 730 is used to shift a georeferenced output image from the standard CRS to the farm machinery CRS. In another example, an agricultural plan (e.g., post-planting treatment prescription, irrigation plan, etc.) may be developed from a georeferenced output image in the standard CRS, and the agricultural plan itself may be shifted from the standard CRS to the farm machinery CRS. In another example, an offset vector is used to shift the geospatial information associated with each aerial image from the standard CRS to the farm machinery CRS prior to combining the aerial images, resulting in a shifted georeferenced output image in the farm machinery CRS. In an example, a georeferenced output image in the farm machinery CRS may be generated using planting data ground control points, and an agricultural plan may be executed by equipment that operates on the standard CRS. Using this georeferenced output image and agricultural plan, an offset vector may be used to shift the georeferenced output image in the farm machinery CRS to the standard CRS. The agricultural plan may be generated automatically or may be generated or updated based on a user input. For example, a user may be prompted to identify an area within the georeferenced output image where the agricultural plan is to be implemented, such as by drawing a shape on a display of the georeferenced output image. In another example, the agricultural plan area is identified automatically, and a user may provide an input for the type or amount of fertilizer or other agricultural treatment to be applied. In another example, the agricultural plan area or treatment may be identified automatically based on the georeferenced output image.

Figure 8:
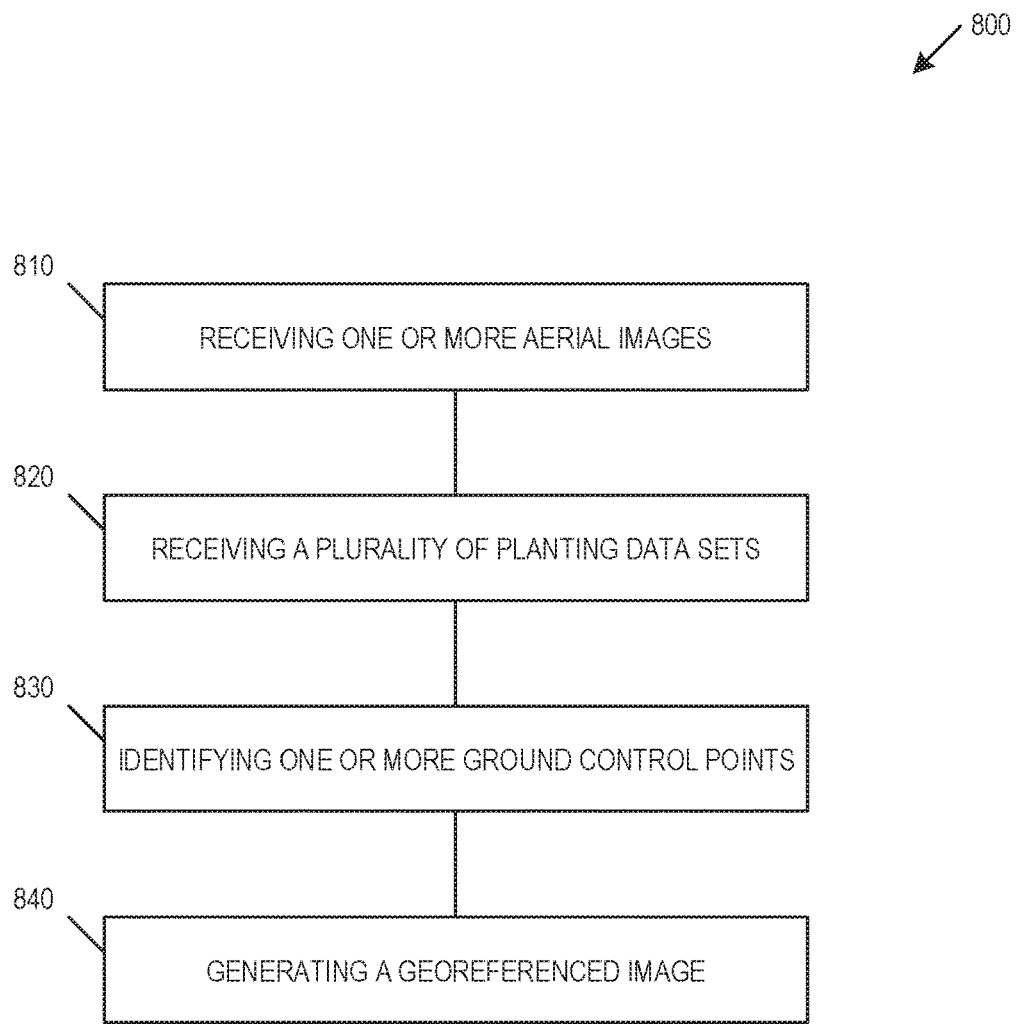
FIG. 8 is a georeference image method, according to an example embodiment.

FIG. 8 is a georeference image method 800, according to an example embodiment. Method 800 includes receiving 810 one or more aerial images. Method 800 includes receiving 820 a plurality of planting data sets. Method 800 includes identifying 830 one or more ground control points. Method 800 includes 840 generating a georeferenced image. The georeferenced reference image may include two or more aerial images stitched together. The planting data may include a planting prescription or as-planted data. The planting data may include one or more planting data features, and the identification of the one or more ground control points is based on the one or more planting data features. The generation of the georeferenced image may include identification of one or more unplanted regions. The generation of the georeferenced image may include identification of an opposite pass to remove an error offset between the plurality of planting data sets and a plurality of achieved planting locations. The generation of the georeferenced image may include identification of an intersection between a plurality of non-parallel planter pass rows, or may include identification of a corner of a planted field.

Figure 9:
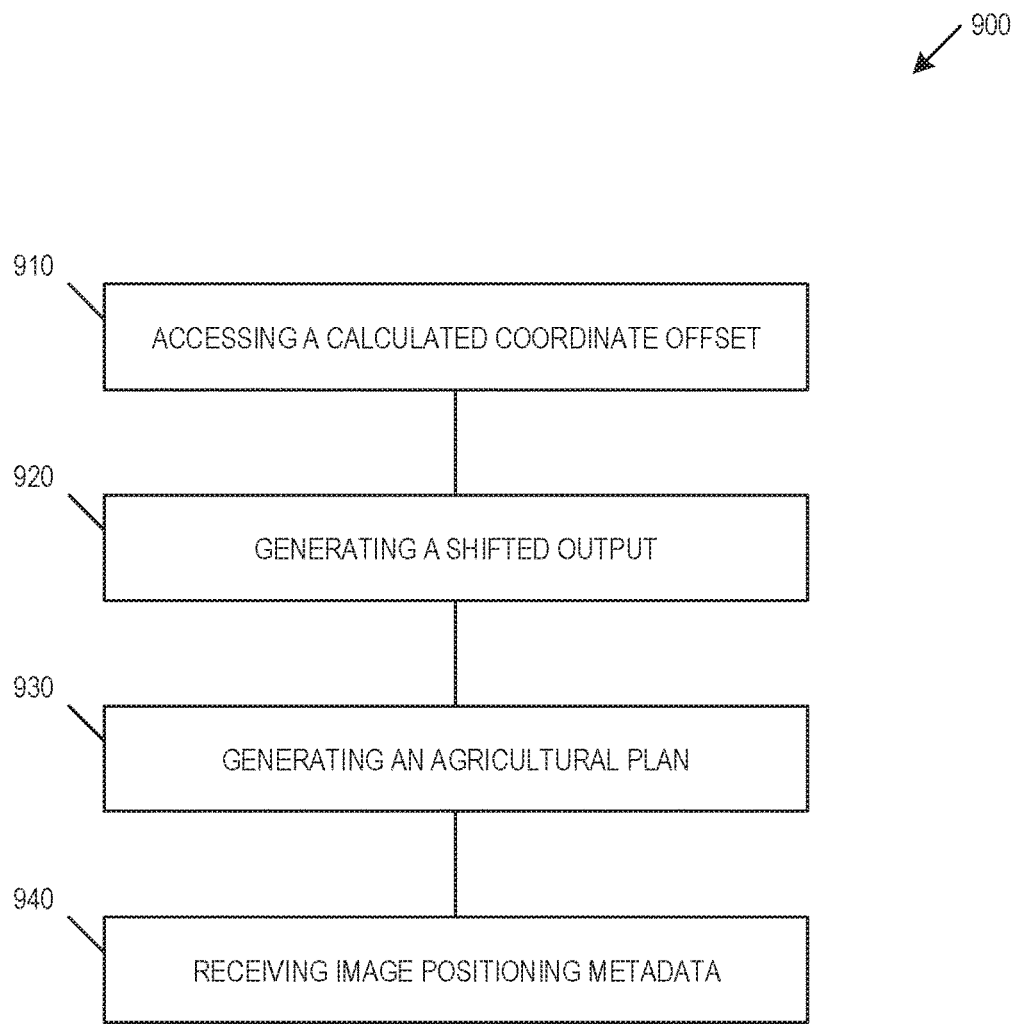
FIG. 9 is a shifted output method, according to an example embodiment.

FIG. 9 is a shifted output method 900, according to an example embodiment. Method 900 includes accessing 910 a calculated coordinate offset. Method 900 includes generating 920 a shifted output. The calculated coordinate offset may be based on a georeferenced reference image and a ground control point. The ground control point identified may be based on a plurality of planting data sets. The georeferenced reference image may be generated based on one or more aerial images. The georeferenced input image may include the georeferenced reference image or may include a subsequent flight image. The generation of the shifted output may include generating a shifted georeferenced image based on the calculated coordinate offset and the georeferenced input image. Method 900 may also include generating 930 an agricultural plan. The generation of the shifted output may include generating a shifted agricultural plan based on the agricultural plan and the calculated coordinate offset. The generation of the shifted output may include shifting a coordinate system of the georeferenced input image between a farm machinery coordinate reference system and a standard coordinate reference system. Method 900 may also include receiving 940 image positioning metadata. The generation of the generation of the georeferenced reference image is further based on the image positioning metadata. The image positioning metadata may include one or more of an image capture device geolocation and an image capture device orientation. The image positioning metadata may include one or more surveyed ground control points. The georeferenced reference image may include two or more aerial images stitched together. The planting data may include a planting prescription or may include as-planted data. The planting data may include one or more planting data features, and the identification of the one or more ground control points is based on the one or more planting data features. The generation of the georeferenced reference image may include identification of one or more unplanted regions. The generation of the georeferenced reference image may include identification of an opposite pass to remove an error offset between the plurality of planting data sets and a plurality of achieved planting locations. The generation of the georeferenced reference image may include identification of an intersection between a plurality of non-parallel planter pass rows, or may include identification of a corner of a planted field.

Figure 10:
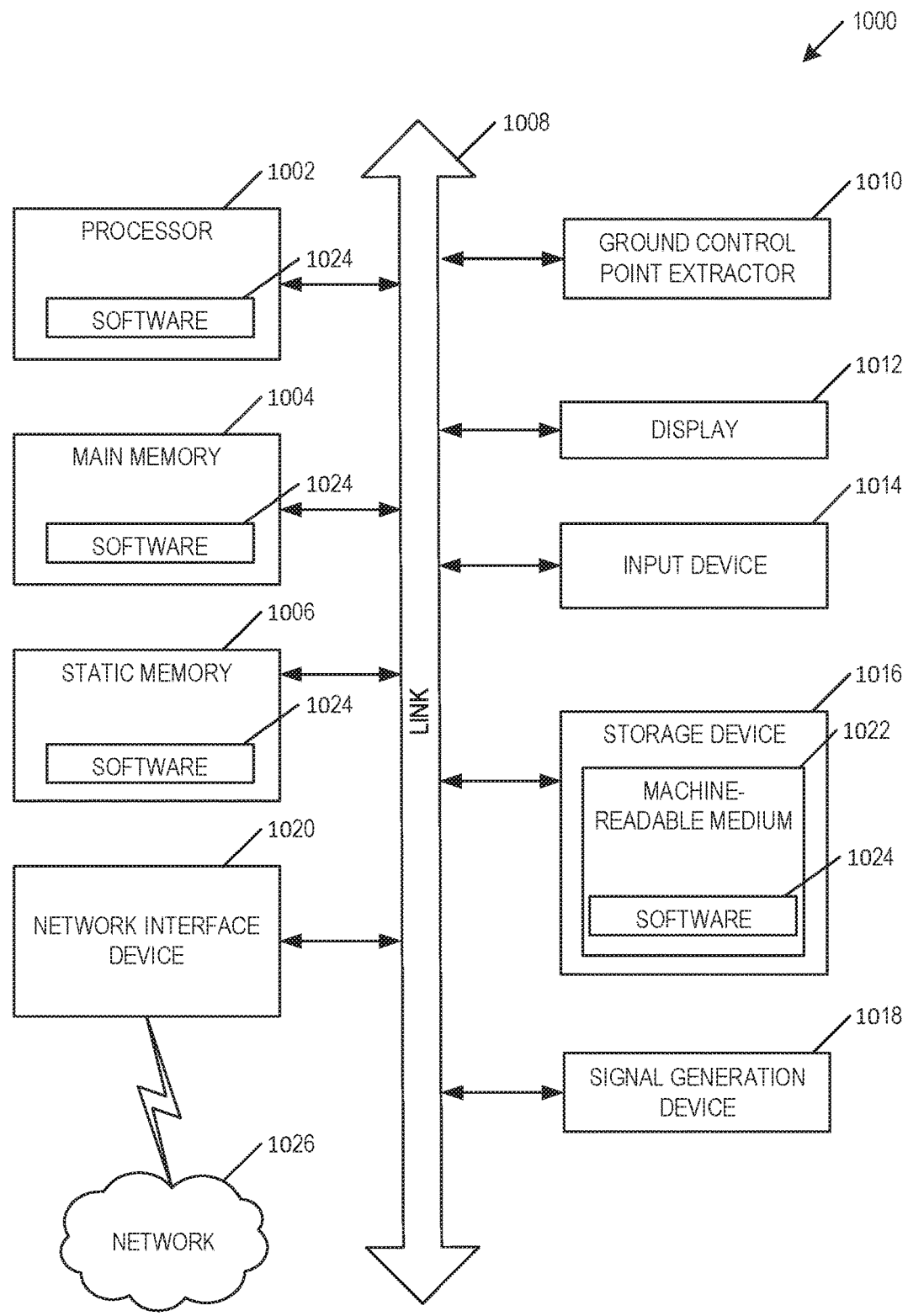
FIG. 10 is a block diagram illustrating a multispectral imagery system in an example form of an electronic device, according to an example embodiment.

FIG. 10 is a block diagram illustrating a multispectral imagery system in an example form of an electronic device 1000, within which a set or sequence of instructions may be executed to cause the machine to perform any one of the methodologies discussed herein, according to an example embodiment. Electronic device 1000 may represent an index survey vehicle, or may represent an electronic device on which the index analysis occurs. In alternative embodiments, the electronic device 1000 operates as a standalone device or may be connected (e.g., networked) to other machines. In a networked deployment, the electronic device 1000 may operate in the capacity of either a server or a client machine in server-client network environments, or it may act as a peer machine in peer-to-peer (or distributed) network environments. The electronic device 1000 may be implemented on a System-on-a-Chip (SoC), a System-in-a-Package (SiP), an integrated circuit (IC), a portable electronic device, a personal computer (PC), a tablet PC, a hybrid tablet, a personal digital assistant (PDA), a mobile telephone, a server computer, or any electronic device 1000 capable of executing instructions (sequential or otherwise) that specify actions to be taken by that machine to detect a user input. Further, while only a single electronic device 1000 is illustrated, the terms "machine" or "electronic device" shall also be taken to include any collection of machines or devices that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to execute instructions, individually or jointly, to perform any one or more of the methodologies discussed herein.

Example electronic device 1000 includes at least one processor 1002 (e.g., a central processing unit (CPU), a graphics processing unit (GPU) or both, processor cores, compute nodes, etc.), a main memory 1004 and a static memory 1006, which communicate with each other via a link 1008 (e.g., bus). The main memory 1004 or static memory 1006 may be used to store navigation data (e.g., predetermined waypoints) or payload data (e.g., stored captured images).

The electronic device 1000 includes a ground control point extractor 1010, such as described with respect to FIGS. 1-8. The electronic device 1000 may further include a display unit 1012, where the display unit 1012 may include a single component that provides a user-readable display and a protective layer, or another display type. The electronic device 1000 may further include an input device 1014, such as a pushbutton, a keyboard, or a user interface (UI) navigation device (e.g., a mouse or touch-sensitive input). The electronic device 1000 may additionally include a storage device 1016, such as a drive unit. The electronic device 1000 may additionally include an image capture device 1018 to provide to capture one or more images for processing as described above. The electronic device 1000 may additionally include a network interface device 1020, and one or more additional sensors (not shown).

The storage device 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004, static memory 1006, or within the processor 1002 during execution thereof by the electronic device 1000. The main memory 1004, static memory 1006, and the processor 1002 may also constitute machine-readable media.

While the machine-readable medium 1022 is illustrated in an example embodiment to be a single medium, the term "machine-readable medium" may include a single medium or multiple media (e.g., a centralized or distributed database, and/or associated caches and servers) that store the one or more instructions 1024. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of well-known transfer protocols (e.g., HTTP). Examples of communication networks include a local area network (LAN), a wide area network (WAN), the Internet, mobile telephone networks, and wireless data networks (e.g., Wi-Fi, NFC, Bluetooth, Bluetooth LE, 3G, 5G LTE/LTE-A, WiMAX networks, etc.). The term "transmission medium" shall be taken to include any intangible medium that is capable of storing, encoding, or carrying instructions for execution by the machine, and includes digital or analog communications signals or other intangible medium to facilitate communication of such software.

To better illustrate the method and apparatuses disclosed herein, a non-limiting list of embodiments is provided here.

Example 1 is an image georeferencing system for extracting ground control points from planting data, the system comprising: one or more processors; a storage device comprising instructions, which when executed by the one or more processors, configure the one or more processors to: receive one or more aerial images; receive a plurality of planting data sets; identify one or more ground control points based on the one or more aerial images and the plurality of planting data sets; and generate a georeferenced image based on the one or more ground control points.

In Example 2, the subject matter of Example 1 optionally includes an image capture device to capture the one or more aerial images.

In Example 3, the subject matter of any one or more of Examples 1-2 optionally include an agricultural planting device to capture the plurality of planting data sets.

In Example 4, the subject matter of any one or more of Examples 1-3 optionally include wherein the georeferenced reference image includes two or more aerial images stitched together.

In Example 5, the subject matter of any one or more of Examples 1-4 optionally include wherein the planting data includes a planting prescription.

In Example 6, the subject matter of any one or more of Examples 1-5 optionally include wherein the planting data includes as-planted data.

In Example 7, the subject matter of any one or more of Examples 1-6 optionally include wherein: the planting data includes one or more planting data features; and the identification of the one or more ground control points is based on the one or more planting data features.

In Example 8, the subject matter of any one or more of Examples 1-7 optionally include wherein the generation of the georeferenced image includes identification of one or more unplanted regions.

In Example 9, the subject matter of any one or more of Examples 1-8 optionally include wherein the generation of the georeferenced image includes identification of an opposite pass to remove an error offset between the plurality of planting data sets and a plurality of achieved planting locations.

In Example 10, the subject matter of any one or more of Examples 1-9 optionally include wherein the generation of the georeferenced image includes identification of an intersection between a plurality of non-parallel planter pass rows.

In Example 11, the subject matter of any one or more of Examples 1-10 optionally include wherein the generation of the georeferenced image includes identification of a corner of a planted field.

Example 12 is an image georeferencing method of extracting ground control points from planting data, the method comprising: receiving one or more aerial images; receiving a plurality of planting data sets; identifying one or more ground control points based on the one or more aerial images and the plurality of planting data sets; and generating a georeferenced image based on the one or more ground control points.

In Example 13, the subject matter of Example 12 optionally includes wherein the georeferenced reference image includes two or more aerial images stitched together.

In Example 14, the subject matter of any one or more of Examples 12-13 optionally include wherein the planting data includes a planting prescription.

In Example 15, the subject matter of any one or more of Examples 12-14 optionally include wherein the planting data includes as-planted data.

In Example 16, the subject matter of any one or more of Examples 12-15 optionally include wherein: the planting data includes one or more planting data features; and the identification of the one or more ground control points is based on the one or more planting data features.

In Example 17, the subject matter of any one or more of Examples 12-16 optionally include wherein the generation of the georeferenced image includes identification of one or more unplanted regions.

In Example 18, the subject matter of any one or more of Examples 12-17 optionally include wherein the generation of the georeferenced image includes identification of an opposite pass to remove an error offset between the plurality of planting data sets and a plurality of achieved planting locations.

In Example 19, the subject matter of any one or more of Examples 12-18 optionally include wherein the generation of the georeferenced image includes identification of an intersection between a plurality of non-parallel planter pass rows.

In Example 20, the subject matter of any one or more of Examples 12-19 optionally include wherein the generation of the georeferenced image includes identification of a corner of a planted field.

Example 21 is one or more machine-readable medium including instructions, which when executed by a computing system, cause the computing system to perform any of the methods of Examples 12-20.

Example 22 is an apparatus comprising means for performing any of the methods of Examples 12-20.

Example 23 is at least one machine-readable storage medium, comprising a plurality of instructions that, responsive to being executed with processor circuitry of a computer-controlled device, cause the computer-controlled device to: receive one or more aerial images; receive a plurality of planting data sets; identify one or more ground control points based on the one or more aerial images and the plurality of planting data sets; and generate a georeferenced image based on the one or more ground control points.

In Example 24, the subject matter of Example 23 optionally includes wherein the georeferenced reference image includes two or more aerial images stitched together.

In Example 25, the subject matter of any one or more of Examples 23-24 optionally include wherein the planting data includes a planting prescription.

In Example 26, the subject matter of any one or more of Examples 23-25 optionally include wherein the planting data includes as-planted data.

In Example 27, the subject matter of any one or more of Examples 23-26 optionally include wherein: the planting data includes one or more planting data features; and the identification of the one or more ground control points is based on the one or more planting data features.

In Example 28, the subject matter of any one or more of Examples 23-27 optionally include wherein the generation of the georeferenced image includes identification of one or more unplanted regions.

In Example 29, the subject matter of any one or more of Examples 23-28 optionally include wherein the generation of the georeferenced image includes identification of an opposite pass to remove an error offset between the plurality of planting data sets and a plurality of achieved planting locations.

In Example 30, the subject matter of any one or more of Examples 23-29 optionally include wherein the generation of the georeferenced image includes identification of an intersection between a plurality of non-parallel planter pass rows.

In Example 31, the subject matter of any one or more of Examples 23-30 optionally include wherein the generation of the georeferenced image includes identification of a corner of a planted field.

Example 32 is a hardware-implemented apparatus for extracting ground control points from planting data, the apparatus comprising: means for receiving one or more aerial images; means for receiving a plurality of planting data; means for identifying at least one ground control point based on the one or more aerial images and the plurality of planting data; and means for generating a georeferenced image based on the at least one ground control point.

In Example 33, the subject matter of Example 32 optionally includes wherein the georeferenced reference image includes two or more aerial images stitched together.

In Example 34, the subject matter of any one or more of Examples 32-33 optionally include wherein the planting data includes a planting prescription.

In Example 35, the subject matter of any one or more of Examples 32-34 optionally include wherein the planting data includes as-planted data.

In Example 36, the subject matter of any one or more of Examples 32-35 optionally include wherein: the planting data includes at least one planting data feature; and the means for identification of the at least one ground control point is based on the at least one planting data feature.

In Example 37, the subject matter of any one or more of Examples 32-36 optionally include wherein the means for generation of the georeferenced image includes means for identification of at least one unplanted region.

In Example 38, the subject matter of any one or more of Examples 32-37 optionally include wherein the means for generation of the georeferenced image includes means for identification of an opposite pass to remove an error offset between the plurality of planting data and a plurality of achieved planting locations.

In Example 39, the subject matter of any one or more of Examples 32-38 optionally include wherein the means for generation of the georeferenced image includes means for identification of an intersection between a plurality of non-parallel planter pass rows.

In Example 40, the subject matter of any one or more of Examples 32-39 optionally include wherein the means for generation of the georeferenced image includes means for identification of a corner of a planted field.

Example 41 is a coordinate offset system comprising: one or more processors; a storage device comprising instructions, which when executed by the one or more processors, configure the one or more processors to: access a calculated coordinate offset, the calculated coordinate offset based on a georeferenced reference image and a ground control point, the ground control point identified based on a plurality of planting data sets, the georeferenced reference image generated based on one or more aerial images; and generate a shifted output based on the calculated coordinate offset and a georeferenced input image.

In Example 42, the subject matter of Example 41 optionally includes an image capture device to capture the one or more aerial images.

In Example 43, the subject matter of any one or more of Examples 41-42 optionally include wherein the georeferenced input image includes the georeferenced reference image.

In Example 44, the subject matter of any one or more of Examples 41-43 optionally include wherein the georeferenced input image includes a subsequent flight image.

In Example 45, the subject matter of any one or more of Examples 41-44 optionally include wherein the generation of the shifted output includes generating a shifted georeferenced image based on the calculated coordinate offset and the georeferenced input image.

In Example 46, the subject matter of any one or more of Examples 41-45 optionally include the processor further to generate an agricultural plan based on the georeferenced input image, wherein the generation of the shifted output includes generating a shifted agricultural plan based on the agricultural plan and the calculated coordinate offset.

In Example 47, the subject matter of any one or more of Examples 41-46 optionally include wherein the generation of the shifted output includes shifting a coordinate system of the georeferenced input image between a farm machinery coordinate reference system and a standard coordinate reference system.

In Example 48, the subject matter of any one or more of Examples 41-47 optionally include the processor further to receive image positioning metadata, wherein the generation of the generation of the georeferenced reference image is further based on the image positioning metadata.

In Example 49, the subject matter of Example 48 optionally includes wherein the image positioning metadata includes one or more of an image capture device geolocation and an image capture device orientation.

In Example 50, the subject matter of any one or more of Examples 48-49 optionally include wherein the image positioning metadata includes one or more surveyed ground control points.

In Example 51, the subject matter of any one or more of Examples 48-50 optionally include an image positioning device to capture the image positioning metadata.

In Example 52, the subject matter of any one or more of Examples 41-51 optionally include wherein the georeferenced reference image includes two or more aerial images stitched together.

In Example 53, the subject matter of any one or more of Examples 41-52 optionally include wherein the planting data includes a planting prescription.

In Example 54, the subject matter of any one or more of Examples 41-53 optionally include wherein the planting data includes as-planted data.

In Example 55, the subject matter of any one or more of Examples 41-54 optionally include wherein: the planting data includes one or more planting data features; and the identification of the one or more ground control points is based on the one or more planting data features.

In Example 56, the subject matter of any one or more of Examples 41-55 optionally include wherein the generation of the georeferenced reference image includes identification of one or more unplanted regions.

In Example 57, the subject matter of any one or more of Examples 41-56 optionally include wherein the generation of the georeferenced reference image includes identification of an opposite pass to remove an error offset between the plurality of planting data sets and a plurality of achieved planting locations.

In Example 58, the subject matter of any one or more of Examples 41-57 optionally include wherein the generation of the georeferenced reference image includes identification of an intersection between a plurality of non-parallel planter pass rows.

In Example 59, the subject matter of any one or more of Examples 41-58 optionally include wherein the generation of the georeferenced reference image includes identification of a corner of a planted field.

Example 60 is a coordinate offset method comprising: accessing a calculated coordinate offset, the calculated coordinate offset based on a georeferenced reference image and a ground control point, the ground control point identified based on a plurality of planting data sets, the georeferenced reference image generated based on one or more aerial images; and generating a shifted output based on the calculated coordinate offset and a georeferenced input image.

In Example 61, the subject matter of Example 60 optionally includes wherein the georeferenced input image includes the georeferenced reference image.

In Example 62, the subject matter of any one or more of Examples 60-61 optionally include wherein the georeferenced input image includes a subsequent flight image.

In Example 63, the subject matter of any one or more of Examples 60-62 optionally include wherein the generation of the shifted output includes generating a shifted georeferenced image based on the calculated coordinate offset and the georeferenced input image.

In Example 64, the subject matter of any one or more of Examples 60-63 optionally include generating an agricultural plan based on the georeferenced input image, wherein the generation of the shifted output includes generating a shifted agricultural plan based on the agricultural plan and the calculated coordinate offset.

In Example 65, the subject matter of any one or more of Examples 60-64 optionally include wherein the generation of the shifted output includes shifting a coordinate system of the georeferenced input image between a farm machinery coordinate reference system and a standard coordinate reference system.

In Example 66, the subject matter of any one or more of Examples 60-65 optionally include receiving image positioning metadata, wherein the generation of the generation of the georeferenced reference image is further based on the image positioning metadata.

In Example 67, the subject matter of Example 66 optionally includes wherein the image positioning metadata includes one or more of an image capture device geolocation and an image capture device orientation.

In Example 68, the subject matter of any one or more of Examples 66-67 optionally include wherein the image positioning metadata includes one or more surveyed ground control points.

In Example 69, the subject matter of any one or more of Examples 60-68 optionally include wherein the georeferenced reference image includes two or more aerial images stitched together.

In Example 70, the subject matter of any one or more of Examples 60-69 optionally include wherein the planting data includes a planting prescription.

In Example 71, the subject matter of any one or more of Examples 60-70 optionally include wherein the planting data includes as-planted data.

In Example 72, the subject matter of any one or more of Examples 60-71 optionally include wherein: the planting data includes one or more planting data features; and the identification of the one or more ground control points is based on the one or more planting data features.

In Example 73, the subject matter of any one or more of Examples 60-72 optionally include wherein the generation of the georeferenced reference image includes identification of one or more unplanted regions.

In Example 74, the subject matter of any one or more of Examples 60-73 optionally include wherein the generation of the georeferenced reference image includes identification of an opposite pass to remove an error offset between the plurality of planting data sets and a plurality of achieved planting locations.

In Example 75, the subject matter of any one or more of Examples 60-74 optionally include wherein the generation of the georeferenced reference image includes identification of an intersection between a plurality of non-parallel planter pass rows.

In Example 76, the subject matter of any one or more of Examples 60-75 optionally include wherein the generation of the georeferenced reference image includes identification of a corner of a planted field.

Example 77 is one or more machine-readable medium including instructions, which when executed by a computing system, cause the computing system to perform any of the methods of Examples 60-76.

Example 78 is an apparatus comprising means for performing any of the methods of Examples 60-76.

Example 79 is at least one machine-readable storage medium, comprising a plurality of instructions that, responsive to being executed with processor circuitry of a computer-controlled device, cause the computer-controlled device to: access a calculated coordinate offset, the calculated coordinate offset based on a georeferenced reference image and a ground control point, the ground control point identified based on a plurality of planting data sets, the georeferenced reference image generated based on one or more aerial images; and generate a shifted output based on the calculated coordinate offset and a georeferenced input image.

In Example 80, the subject matter of Example 79 optionally includes wherein the georeferenced input image includes the georeferenced reference image.

In Example 81, the subject matter of any one or more of Examples 79-80 optionally include wherein the georeferenced input image includes a subsequent flight image.

In Example 82, the subject matter of any one or more of Examples 79-81 optionally include wherein the generation of the shifted output includes generating a shifted georeferenced image based on the calculated coordinate offset and the georeferenced input image.

In Example 83, the subject matter of any one or more of Examples 79-82 optionally include the plurality of instructions further causing the computer-controlled device to generate an agricultural plan based on the georeferenced input image, wherein the generation of the shifted output includes generating a shifted agricultural plan based on the agricultural plan and the calculated coordinate offset.

In Example 84, the subject matter of any one or more of Examples 79-83 optionally include wherein the generation of the shifted output includes shifting a coordinate system of the georeferenced input image between a farm machinery coordinate reference system and a standard coordinate reference system.

In Example 85, the subject matter of any one or more of Examples 79-84 optionally include the plurality of instructions further causing the computer-controlled device to receive image positioning metadata, wherein the generation of the generation of the georeferenced reference image is further based on the image positioning metadata.

In Example 86, the subject matter of Example 85 optionally includes wherein the image positioning metadata includes one or more of an image capture device geolocation and an image capture device orientation.

In Example 87, the subject matter of any one or more of Examples 85-86 optionally include wherein the image positioning metadata includes one or more surveyed ground control points.

In Example 88, the subject matter of any one or more of Examples 79-87 optionally include wherein the georeferenced reference image includes two or more aerial images stitched together.

In Example 89, the subject matter of any one or more of Examples 79-88 optionally include wherein the planting data includes a planting prescription.

In Example 90, the subject matter of any one or more of Examples 79-89 optionally include wherein the planting data includes as-planted data.

In Example 91, the subject matter of any one or more of Examples 79-90 optionally include wherein: the planting data includes one or more planting data features; and the identification of the one or more ground control points is based on the one or more planting data features.

In Example 92, the subject matter of any one or more of Examples 79-91 optionally include wherein the generation of the georeferenced reference image includes identification of one or more unplanted regions.

In Example 93, the subject matter of any one or more of Examples 79-92 optionally include wherein the generation of the georeferenced reference image includes identification of an opposite pass to remove an error offset between the plurality of planting data sets and a plurality of achieved planting locations.

In Example 94, the subject matter of any one or more of Examples 79-93 optionally include wherein the generation of the georeferenced reference image includes identification of an intersection between a plurality of non-parallel planter pass rows.

In Example 95, the subject matter of any one or more of Examples 79-94 optionally include wherein the generation of the georeferenced reference image includes identification of a corner of a planted field.

Example 96 is a coordinate offset apparatus comprising: means for accessing a calculated coordinate offset, the calculated coordinate offset based on a georeferenced reference image and a ground control point, the ground control point identified based on a plurality of planting data, the georeferenced reference image generated based on one or more aerial images; and means for generating a shifted output based on the calculated coordinate offset and a georeferenced input image.

In Example 97, the subject matter of Example 96 optionally includes wherein the georeferenced input image includes the georeferenced reference image.

In Example 98, the subject matter of any one or more of Examples 96-97 optionally include wherein the georeferenced input image includes a subsequent flight image.

In Example 99, the subject matter of any one or more of Examples 96-98 optionally include wherein the means for generation of the shifted output includes means for generating a shifted georeferenced image based on the calculated coordinate offset and the georeferenced input image.

In Example 100, the subject matter of any one or more of Examples 96-99 optionally include means for generating an agricultural plan based on the georeferenced input image, wherein the means for generation of the shifted output includes means for generating a shifted agricultural plan based on the agricultural plan and the calculated coordinate offset.

In Example 101, the subject matter of any one or more of Examples 96-100 optionally include wherein the means for generation of the shifted output includes means for shifting a coordinate system of the georeferenced input image between a farm machinery coordinate reference system and a standard coordinate reference system.

In Example 102, the subject matter of any one or more of Examples 96-101 optionally include means for receiving image positioning metadata, wherein the means for generation of the generation of the georeferenced reference image is further based on the image positioning metadata.

In Example 103, the subject matter of Example 102 optionally includes wherein the image positioning metadata includes at least one of an image capture device geolocation and an image capture device orientation.

In Example 104, the subject matter of any one or more of Examples 102-103 optionally include wherein the image positioning metadata includes one or more surveyed ground control points.

In Example 105, the subject matter of any one or more of Examples 96-104 optionally include wherein the georeferenced reference image includes two or more aerial images stitched together.

In Example 106, the subject matter of any one or more of Examples 96-105 optionally include wherein the planting data includes a planting prescription.

In Example 107, the subject matter of any one or more of Examples 96-106 optionally include wherein the planting data includes as-planted data.

In Example 108, the subject matter of any one or more of Examples 96-107 optionally include wherein: the planting data includes at least one planting data feature; and the identification of the at least one ground control point is based on the at least one planting data feature.

In Example 109, the subject matter of any one or more of Examples 96-108 optionally include wherein the means for generation of the georeferenced reference image includes means for identification of at least one unplanted region.

In Example 110, the subject matter of any one or more of Examples 96-109 optionally include wherein the means for generation of the georeferenced reference image includes means for identification of an opposite pass to remove an error offset between the plurality of planting data and a plurality of achieved planting locations.

In Example 111, the subject matter of any one or more of Examples 96-110 optionally include wherein the means for generation of the georeferenced reference image includes means for identification of an intersection between a plurality of non-parallel planter pass rows.

In Example 112, the subject matter of any one or more of Examples 96-111 optionally include wherein the means for generation of the georeferenced reference image includes means for identification of a corner of a planted field.

Example 113 is one or more machine-readable medium including instructions, which when executed by a machine, cause the machine to perform operations of any of the operations of Examples 1-112.

Example 114 is an apparatus comprising means for performing any of the operations of Examples 1-112.

Example 115 is a system to perform the operations of any of the Examples 1-112.

Example 116 is a method to perform the operations of any of the Examples 1-112.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope should be determined with reference to the appended claims, along with the full scope of equivalents to which such claims are entitled.

The invention claimed is:

1. An image georeferencing system for extracting one or more ground control points from planting data, the system comprising:
   one or more processors;
   a storage device comprising instructions, which when executed by the one or more processors, configure the one or more processors to:
      receive one or more aerial images;
      receive the planting data, wherein the planting data comprises as-planted data captured by a planter vehicle or a planting prescription used by a planter vehicle;
      identify the one or more ground control points based on the one or more aerial images and the planting data; and
      generate a georeferenced image based on the one or more ground control points.

2. The system of claim 1, further including an image capture device to capture the one or more aerial images.

3. The system of claim 2, further comprising an aerial vehicle, and the image capture device is mounted on an aerial vehicle.

4. The system of claim 1, wherein:
   the planting data includes one or more planting data features; and
   the identification of the one or more ground control points is based on the one or more planting data features.

5. The system of claim 1, wherein the generation of the georeferenced image includes identification of one or more unplanted regions.

6. An image georeferencing method of extracting one or more ground control points from planting data, the method comprising:

receiving one or more aerial images;

receiving the planting data, wherein the planting data comprises as-planted data captured by a planter vehicle or a planting prescription used by a planter vehicle;

identifying the one or more ground control points based on the one or more aerial images and the planting data; and generating a georeferenced image based on the one or more ground control points.

7. The method of claim 6, wherein:

the planting data includes one or more planting data features; and the identification of the one or more ground control points is based on the one or more planting data features.

8. The method of claim 6, wherein the generation of the georeferenced image includes identification of one or more unplanted regions.

9. The method of claim 6, comprising capturing the one or more aerial images using an image capture device mounted on an aerial vehicle.

10. At least one non-transitory machine-readable storage medium, comprising a plurality of instructions that, responsive to being executed with processor circuitry of a computer-controlled device, cause the computer-controlled device to:

receive one or more aerial images;

receive planting data, wherein the planting data comprises as-planted data captured by a planter vehicle or a planting prescription used by a planter vehicle;

identify one or more ground control points based on the one or more aerial images and the planting data; and generate a georeferenced image based on the one or more ground control points.

11. The non-transitory machine-readable storage medium of claim 10, wherein:

the planting data includes one or more planting data features; and the identification of the one or more ground control points is based on the one or more planting data features.

12. The non-transitory machine-readable storage medium of claim 10, wherein the generation of the georeferenced image includes identification of one or more unplanted regions.

* * * * *